United States Patent
Looney

[11] Patent Number: 4,474,208
[45] Date of Patent: Oct. 2, 1984

[54] SAFETY VALVE
[75] Inventor: Raymond H. Looney, Tulsa, Okla.
[73] Assignee: Baird Manufacturing Company, Tulsa, Okla.
[21] Appl. No.: 484,565
[22] Filed: Apr. 13, 1983
[51] Int. Cl.³ .............................................. F16K 15/04
[52] U.S. Cl. ............................ 137/516.29; 137/539.5; 251/332; 251/363
[58] Field of Search ...................... 137/516.29, 533.15, 137/539, 539.5; 251/332, 363, 364

[56]           References Cited
       U.S. PATENT DOCUMENTS

| 2,322,139 | 6/1943  | Kaelin     | 137/539.5 X |
| 2,409,220 | 10/1946 | Melichar   | 251/332 X   |
| 2,959,188 | 11/1960 | Kepner     | 251/332 X   |
| 3,346,008 | 10/1967 | Scaramucci | 137/516.29  |
| 3,359,995 | 12/1967 | Parisi     | 137/539 X   |

FOREIGN PATENT DOCUMENTS 6045  8/1921  Netherlands .................. 137/533.15

Primary Examiner—Robert G. Nilson
Attorney, Agent, or Firm—Head, Johnson & Stevenson

[57]            ABSTRACT

A safety valve formed of a body with a fluid inlet and outlet and a passageway there between having a reduced diameter port providing an internal radial ledge, a cylindrical seat member supported on the internal ledge, the seat member having a circumferential groove in the upper face, the groove having an inner frusto-conical surface tapering inwardly in the upper direction so that the width of the groove is wider at the top than at the bottom, a toroidal elastomeric seal received in the seat member groove, the lower portion of the seal being configured to correspond to the groove with an integral upwardly extending reduced internal diameter lip portion, a cylindrical seat retainer member engaging the upper end of the seat member to retain it in position and simultaneously engaging a portion of the upper surface of the seal to retain it in the groove, and a spring biased ball member positioned above the seat member permitting so that fluid flow through the valve body when the fluid pressure exceeds a pre-selected level.

9 Claims, 3 Drawing Figures

SAFETY VALVE

SUMMARY OF THE INVENTION

A safety valve is provided which is usable for substantially any fluid but is particularly useful as a gas safety valve. The valve includes a body having a fluid inlet and a fluid outlet. Within the body between the inlet and outlet is a fluid passageway defined in part by a reduced internal diameter seating port which provides an internal radial ledge. A cylindrical seat member is employed having an axial passageway through it and having an upper and a lower planar face. The lower planar face of the seat member engages the body internal radial ledge so that fluid passing through the valve body passes through the seat axial passageway.

The upper face of the seat member has a circumferential groove in it. The groove is defined by an outer cylindrical surface, a radial bottom surface parallel of the seat lower planar face, and an inner frusto-conical surface tapering inwardly in the upper direction. Thus the groove has a width at the top which is wider than the width at the bottom.

A toroidal elastomeric seal is positioned in the groove in the seat member. The seal is defined by an outer cylindrical surface and a radial bottom surface of substantially the dimensions of the seat member groove, and an inner frusto-conical surface of height greater than the groove inner frusto-conical surface. The outer diameter portion of the seal upper surface is planar and substantially equal in depth to that of the seat member groove. The inner diameter portion of the seal upper surface is of a depth greater than the groove thereby providing an integral upwardly extending reduced internal diameter lip portion.

A cylindrical seat retainer member is positioned within the valve body and has a seat member engaging surface, the outer diameter portion of which is planar and which engages the outer diameter portion of the seat member upper planar face and the upper planar outer diameter surface of the seal. The seat member also engages the outer diameter portion of the integral upwardly extending lip portion of the seal. The seat retainer member thereby serves the dual function of retaining the seat member and the seal in position within the valve and supports the integral upwardly and inwardly extending circumferential seal lip portion in a pre-selected manner.

Positioned within the valve body is a ball member which is displaced upwardly by the flow of fluid through the valve body. In its downward position the peripheral surface of the ball engages the seal lip portion to close the valve against fluid flow through it.

Also positioned within the valve body is a compression spring which urges the ball downwardly. In the prefered and illustrated arrangement, the ball is urged downwardly by a ball follower which contacts the upper side of the ball, the ball follower having an integral cylindrical portion. Above the ball follower is a threaded rod which extends through an internally threaded opening in the valve body. The threaded rod has a cylindrical portion at the lower end thereof and the axis of the rod is in alignment with the axis of the cylindrical portion of the ball follower. The spring is compressively received between the ball follower and the threaded rod. By threadably downwardly adjusting the rod the compressive force applied to the ball follower and thereby to ball is increased. This compressive force thereby increases the amount of fluid pressure necessary to displace the seat to allow fluid to flow through the valve.

In the preferred embodiment the valve body is formed of a first lower tubular portion which has the fluid inlet therein and which forms the internal ledge on which the valve seat is supported, and a second, upper portion having the fluid outlet therein. The second body portion includes the cylindrical opening which threadably receives the rod by which the compressive force applied to the ball may be adjusted.

The valve seat retainer member may be arranged to provide a supplemental circumferential sealing surface which is spaced above the elastomeric sealing lip portion so that when the ball is forced downwardly to compress the lip portion a metal to metal seal closing the valve is attained between the ball and the seat retainer sealing surface.

In still another embodiment a seat retainer element is employed between a threaded seat retainer follower and the valve seat. The seat retainer has an integral, downwardly extending tubular portion, the internal diameter of which is greater than the external diameter of the seat member so that the seat member is telescopically received by the seat retainer.

The valve as disclosed herein has improved safety features in that it provides a soft seal having greater leak proof assurances and, in some embodiments, a combination soft seal and metal-to-metal seal, all achieved in an arrangement wherein the valve is economical of construction and easy to repair.

DETAILED DESCRIPTION

Figure 1:
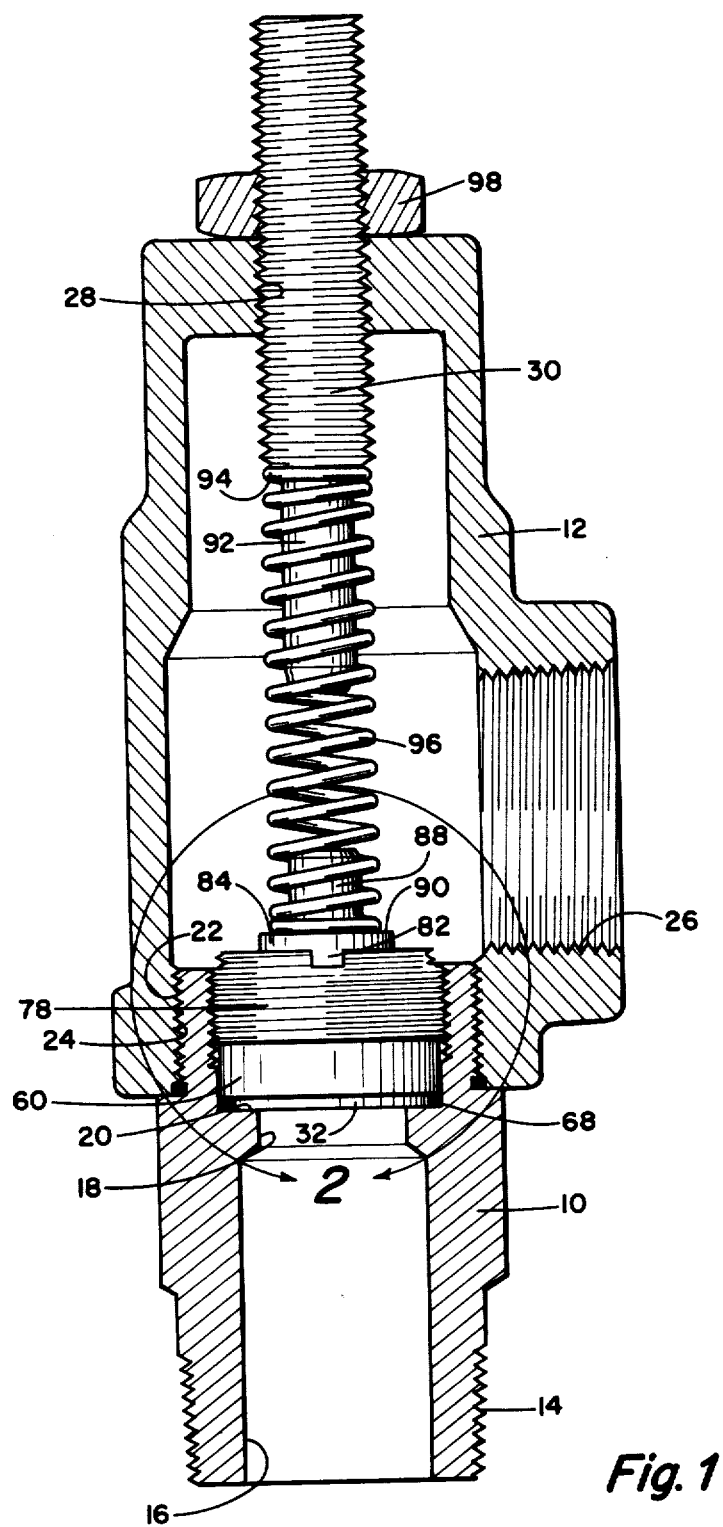
FIG. 1 is an elevational cross-sectional view of one embodiment of a valve embodying the principles of this invention.

Referring now to the drawings, and first to FIG. 1 the safety valve is formed of a body which, in the preferred arrangement, is formed of two portions, that is, a lower body portion 10 and an upper body portion 12. The lower body portion 10 is substantially tubular and is threaded at 14 at its lower end by which it may be secured to piping or directly to a pressure vessel. The lower tubular opening 16 forms a fluid inlet. The valve will be described as it may be employed for any fluid however, a preferred application is the use of the valve as a gas safety valve.

Formed within the lower body portion 16 is a reduced internal diameter seating port 18 which provides an internal radial ledge 20.

The upper end of the lower body 10 is provided with external threads 22 which receives the internal threaded portion 24 of the upper body 12. A threaded side outlet 26 provides a fluid outlet for the valve.

Formed in the upper valve body 12 is a reduced diameter threaded opening 28 which receives an externally threaded rod 30, the upper end of which is externally of the valve body.

Figure 2:
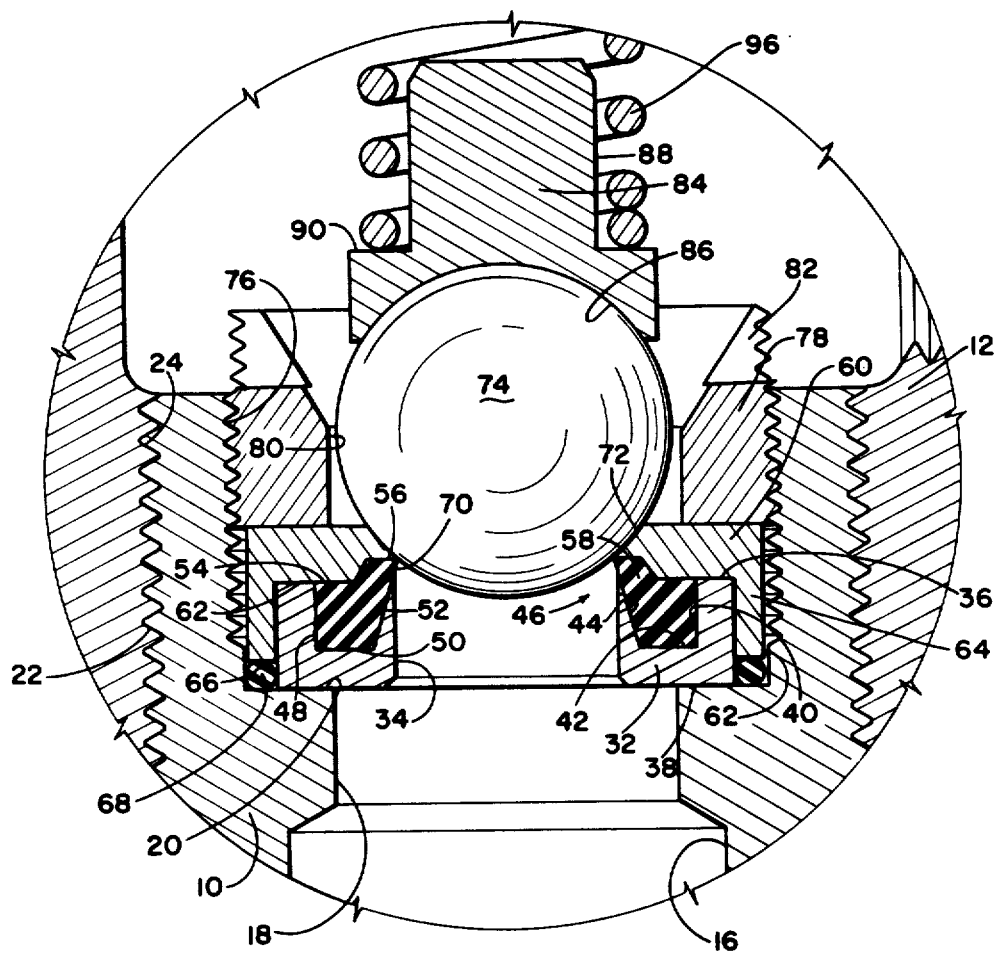
FIG. 2 is an enlarged cross-sectional view of the seat member showing more details of the construction of the seat member, the toroidal elastomeric seal and the seat retainer member as utilized in the valve.

Supported on the internal ledge 20 is a cylindrical seat member 32 which has an axial passageway 34 therethrough (see FIG. 2). The seat member has an upper and lower planar face 36 and 38 respectfully. The lower planar face 38 rests on the valve body internal ledge 20.

Formed in the seat member upper planar face 16 is a circumferential groove defined by (a) an outer cylindrical surface 40; (b) a radial bottom surface 42 which is parallel the seat member lower planar face 38; and (c) an inner frustoconical surface 44 which tapers inwardly in the upper direction. The groove thus formed by surfaces 40, 42 and 44 has a width at the top which is wider than at the bottom.

Positioned within the seat member groove is a toroidal elastomeric seal generally indicated by the numeral 46. The seal is defined by: (a) an outer cylindrical surface 48; (b) a radial bottom surface 50; (c) an inner frusto-conical surface 52 which is of height greater than the frusto-conical surface 44 of the groove; (d) an upper surface outer radial portion 54 which is parallel the radial bottom surface 50; and (e) an inner upper radial surface 56 which is parallel the radial bottom surface 50 and extends above the height of the seat member upper planar face 36.

Thus, the seal 46 is dimensioned in its lower portion to be received in and configured in cross-section to conform to the groove in the seat member 32 with the seal having an integral upwardly extending circumferential lip portion 58.

A cylindrical seat retainer member 60 is provided to engage the seat member 32 and the seal 46 to retain these elements in position within the valve. The seat retainer member 60 has a lower radial surface 62 which engages seat member upper planar face 36 and the upper surfaces 54 and 56 of seal 46. The seat retainer member 60 also includes a downwardly extending outer integral tubular portion 64 which telescopically receives seat member 32. Positioned between the lower planar face 66 of the seat retainer member and the valve body radial ledge 20 is an o ring gasket 68.

In the arrangement of FIG. 2 the seat retainer member has a fluid passageway 70 therethrough, the upper surface 72 of which is configured to engage and seal against a ball member 74. It is the upward and downward position of the ball member 74 which functions either to open or close the valve against fluid flow as will be described in greater detail subsequently. The complimentary arrangement of the seal lip portion 58 and the sealing surface 72 of the seat retainer functions to provide both an elastomeric or "soft" seal and a metal to metal seal of the ball valve 74.

The upper end of the lower body portion 10 is internally threaded at 76 above the radial ledge 20. An externally threaded seal retainer follower 78 is received in the body threaded portion 76 to engage the upper surface of the seat retainer 60 to thereby hold it in position. The seat retainer follower 78 includes an internal passageway 80 through which fluid flows in the passageways also functions as a guide for ball 74. By selected configuration of the internal passageway 80 the characteristics of the valve to cause upward displacement of ball 74 by fluid flow can be regulated.

Formed in the upper end of the tubular seat retainer 78 are notches 82 which permit the seat retainer to be threaded into position in the upper end of the lower body portion 10 or to permit unthreading when it is necessary to replace the seat member 32, seal 46 and seat retainer member 60 or the o-ring gasket 68.

Engaging the upper surface of ball 74 is a ball follower 84 having a lower surface 86 configured to match the spherical dimensions of the ball. The ball follower 84 has a reduced diameter integral upwardly extending cylindrical portion 88 providing a radial ledge 90.

As previously indicated, extending from externally to internally of the valve is a threaded rod 30. The rod 30 has a lower co-axial reduced diameter cylindrical portion 92 which forms a radial ledge 94. Compressively received between the threaded rod 30 and the ball follower 84 is a coiled spring 96. The cylindrical portion 88 of the ball follower 84 is maintained in axial alignment with the threaded rod cylindrical portion 92 by spring 96. By threaded adjustment of rod 30 the amount of compressive force applied to ball 74 is controlled, which may be accomplished externally of the valve such as by allen wrench recess (not shown) in the upper end of the threaded rod. To retain the threaded rod in a selected position, a nut 98 may be tightened against the valve body.

It can be seen that fluid can flow through the valve only in one direction, that is from the inlet 16 to the outlet 26 and cannot, under any conditions, flow in the opposite direction since the valve functions as a check valve. However, fluid can flow through the valve from the inlet to the outlet only when pressure within the piping, vessel or the like connected to the fluid inlet exceeds a preselected level determined by the position of the threaded rod 30. When the fluid pressure is sufficiently high to displace ball 74, fluid can flow through the valve. Thereby, the valve is useful for maintaining a preselected back pressure and functions to relieve pressure above a preselected level. Of most significance is the arrangement of providing an improved elastomeric or "soft" seal in a manner which retains the seal 46 securely but at the same time, permits easy replacement without requiring special tools or other equipment. The seal can readily be positioned within a groove formed in the seat member 32 but when the seat retainer member 60 is in secure position the seat cannot be displaced regardless of the force of fluid flow through the valve.

Figure 3:
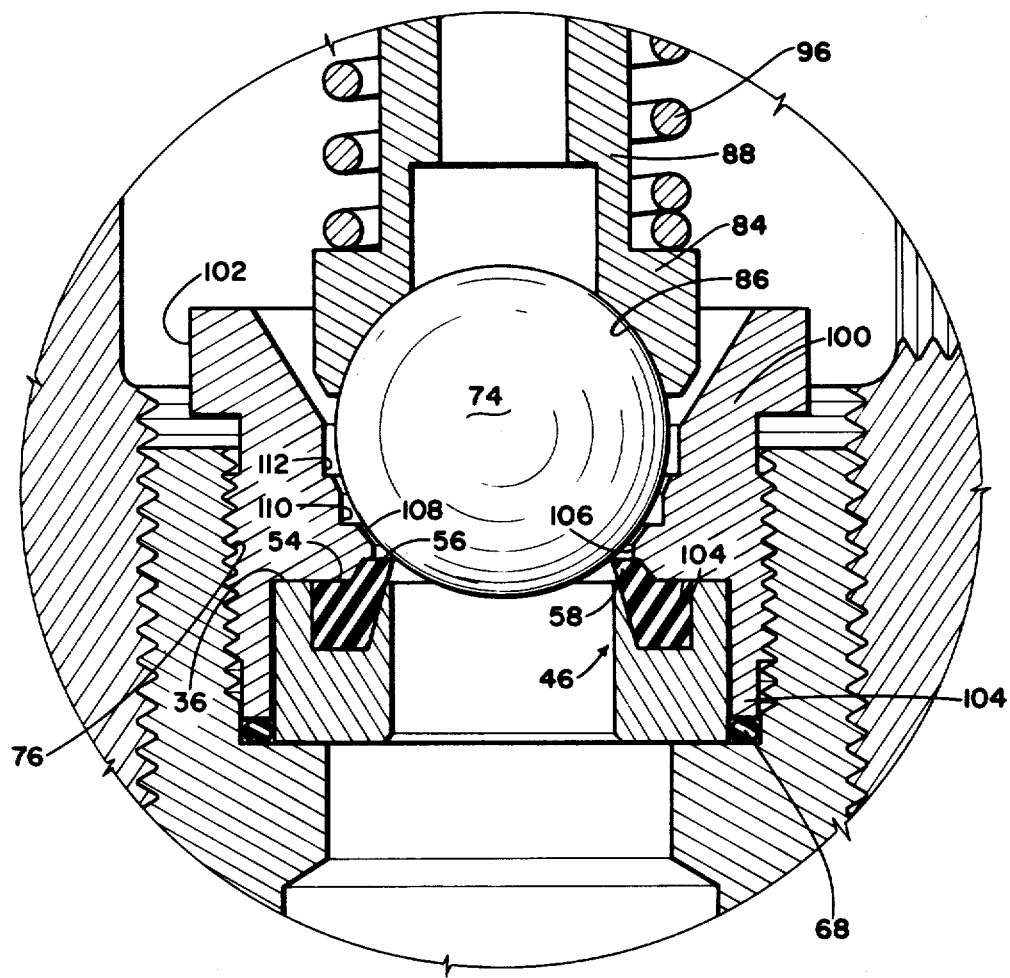
FIG. 3 is an enlarged partial cross-sectional view as in FIG. 2 showing an alternate embodiment of the invention wherein the seat retainer is formed of one piece.

FIG. 3 shows an alternate arrangement of the valve. The primary difference is that the seat retainer member 60 and the seat retainer follower 78 of the FIG. 2 configuration are combined into a unitary device in the embodiment of FIG. 3. Specifically, in FIG. 3, an externally threaded tubular seat retainer 100 is employed which may have a hexagonal or octagonal upper surface 102 by which it is positioned within the internal threaded portion 76 of the lower body. The seat retainer 100 an has integral downwardly extending tubular portion 104, the lower planar surface of which engages the o-ring gasket 68.

The seat retainer 100 has an inner lower radial surface 104 which engages the upper planar surface 36 of the seat member and the upper surface 54 and 56 of the elastomeric seal 46.

The fluid passageway 106 through the seat retainer 100 includes a circumferential sealing surface 108 which is engaged by ball 74 when it is in its downward position. When the ball 74 is in engagement with the surface 108 the lip portion 58 of seal 46 has first been contacted and compressed to ensure that a resilient seal is achieved when the valve is in the closed position.

The fluid passageway 106 of the seat retainer 100 may be further provided with circumferential grooves 110 and 112 to achieve preselected ball lift characteristics at various flow rates of fluid through the valve.

The arrangements of FIGS. 2 and 3 function in the same way and achieve the same results and are exemplary of the fact that the valve of this invention may be constructed in a variety of different ways.

While the invention has been described with a certain degree of particularity it is manifested many changes may be made in the details of construction and the arrangement of components without departing from the spirit and scope of this invention. It is understood that the invention is not limited to the embodiments set forth herein for purposes of exemplification, but is to be limited only by the scope of the attached claim or claims, including the full range of equivalency to which each element thereof is entitled.

What is claimed is:

1. A safety valve comprising:
   a body having a fluid inlet and a fluid outlet and an internal passageway between the inlet and outlet, the passageway being defined in part by a reduced internal diameter seating port providing an internal radial ledge;
   a cylindrical seat member having an axial passageway therethrough and having an upper and a lower planar face, the lower face engaging said body internal radial ledge, the upper face having a circumferential groove therein defined by an outer cylindrical surface, a radial bottom surface parallel said lower planar face, and an inner frusto-conical surface tapering inwardly in the upper direction whereby the width of the groove is wider at the top than at the bottom;
   a toroidal elastomeric seal received in said seat member being defined by an outer cylindrical surface, and a radial bottom surface of substantially the dimensions of said seat member groove, by an inner frusto-conical surface of height greater than said groove inner frusto-conical surface, and by an upper surface the outer diameter portion of which is substantially co-planar with said seat upper planar face, and the inner diameter portion which is of a height greater than said seat upper planar face thereby providing an integral upwardly extending reduced internal diameter lip portion;
   a cylindrical seat retainer member positioned within said valve body having a seat member engaging surface, an outer diameter portion of which is planar and which engages the outer diameter portion of said seat member upper planar face and said upper planar outer diameter surface of said seal and engages the outer diameter portion of said seal integral upwardly extending lip portion;
   means to secure said seat retainer within said valve body;
   a ball member positioned within said body and above said seat; and
   means to urge said ball downwardly into engagement with said seal whereby in the downward position said ball engages said seal integral upwardly extending lip portion.

2. A safety valve according to claim 1 wherein said seat retainer has an inner circumferential seating surface spaced above said lower surface and of a diameter greater than the minimum diameter of said seal integral upwardly extending lip portion whereby as said ball member moves downwardly towards said seat member it first engages said seal before engaging said seat retainer seating surface.

3. A safety valve according to claim 1 wherein said body is formed of a first, lower tubular portion having said fluid inlet and said integral radial ledge and having, at the upper end above said ledge an internally threaded portion and an externally threaded portion, and wherein said seat retainer member is externally threaded and received within the body lower internally threaded portion, and said body including a second, upper portion having said fluid outlet therein, the upper portion having an internally threaded lower end engaging said lower body upper externally threaded portion.

4. A safety valve according to claim 3 wherein said body upper portion has a closed upper end with a reduced diameter threaded opening therein coaxial with said internally threaded lower end, said fluid outlet being in the body sidewall between said lower and upper ends; and
   a threaded rod received in said upper body portion threaded opening, said means to urge said ball member downwardly being engaged by said rod.

5. A safety value according to claim 4 wherein said ball member includes an upwardly extending cylindrical portion, and wherein said threaded rod includes a downwardly extending cylindrical portion, such portions being coaxial; and
   a compression spring received on said coaxial cylindrical rod and ball member cylindrical portions.

6. A safety valve according to claim 1 wherein said valve body has an internally threaded portion above said internal ledge and wherein said seat retainer member is externally threaded, the threaded engagement of said seat retainer and said body internally threaded portion providing said means of retaining said seat member.

7. A safety valve according to claim 1 wherein said valve body has an internally threaded portion above said internal ledge and wherein said seat retainer is slideably received within said body internally threaded portion and including a tubular, externally threaded seat retainer follower received in said body internally threaded portion, the lower end of which engages said seat retainer and serves as said means of securing said seat retainer.

8. A safety valve according to claim 1 wherein said seat retainer includes an integral, downwardly extending tubular portion the internal diameter of which is greater than the external diameter of said seat member whereby said seat member is telescopically received in said seat retainer.

9. A safety valve according to claim 8 including a toroidal gasket member received externally of said seat member and between the lower planar end of said seat retainer integral downwardly extending tubular portion and said valve body ledge.

* * * * *